(12) United States Patent
Rios-Vega

(10) Patent No.: US 6,914,339 B2
(45) Date of Patent: Jul. 5, 2005

(54) KINETIC ENERGY POWERED MOTOR (KINEMOT) SYSTEM

(75) Inventor: Pablo Rios-Vega, San Juan, PR (US)

(73) Assignee: Ing. Pablo Rios-Vega, P.E., San Juan, PR (US)

( * ) Notice: Subject to any disclaimer, the term of this patent is extended or adjusted under 35 U.S.C. 154(b) by 106 days.

(21) Appl. No.: 10/413,991

(22) Filed: Apr. 15, 2003

(65) Prior Publication Data

US 2004/0207203 A1 Oct. 21, 2004

(51) Int. Cl.$^7$ ................................................. H02P 9/00
(52) U.S. Cl. ...................................... 290/1 R; 290/1 A
(58) Field of Search ............................... 290/1 R, 1 A, 290/39; 322/3, 1

(56) References Cited

U.S. PATENT DOCUMENTS

| | | | | |
|---|---|---|---|---|
| 4,246,753 A | * | 1/1981 | Redmond | 60/398 |
| 4,326,132 A | * | 4/1982 | Bokel | 290/1 R |
| 4,731,545 A | * | 3/1988 | Lerner et al. | 290/54 |
| 6,507,125 B1 | * | 1/2003 | Choi | 290/1 R |
| 6,809,426 B2 | * | 10/2004 | Naar et al. | 290/1 R |

* cited by examiner

*Primary Examiner*—Nicholas Ponomarenko

(57) ABSTRACT

A new approach to use energy of a compressed air in combination with the moving rotational masses for generation of an electrical power is provided. A system has a tower with rotating masses driving an electrical generator where a compressed air with its reservoir and air compressor provides power for generation.

1 Claim, 7 Drawing Sheets

NOTE: BALL BEARING NOT SHOWN

NOTE: BALL BEARING NOT SHOWN

NOTE: BALL BEARING NOT SHOWN

NOTE: BALL BEARING NOT SHOWN

ELECTRICAL ONE LINE DIAGRAM

KINETIC ENERGY POWERED MOTOR (KINEMOT) SYSTEM

CROSS-REFERENCE TO RELATED APPLICATIONS

N/A

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISK

N/A

BACKGROUND OF THE INVENTION

It is of all known about the lack and limitation of the availability of fossil fuels in the world nowadays and in the near future. New sources of energy production as the nuclear energy, fuel cell, aeolic, solar cell and others are under development and in limited use, but neither one yet assuming the leadership in intensive production. These new sources of energy are by far to depend on exclusively due to the constraints of very expensive development and manufacturing costs. A new breach in the non fossil fuel energy production is achieved with my invention of the Kinetics Energy Powered Motor System which depends on kinetic energy produced by a mass on circular motion on a rotating shaft. The main elements of my invention are all presently produced or can be easily produced and made available in the industry. These are assembled in a way to maximize the advantages of natural energy produced by a weight in downward movement.

BRIEF SUMMARY OF THE INVENTION

My invention makes use of the natural kinetic energy produced by a rotating mass thus having the advantage over any type of man processed energy driven motor, making it the cheapest and easiest machine ever produced.

Figure 1A:
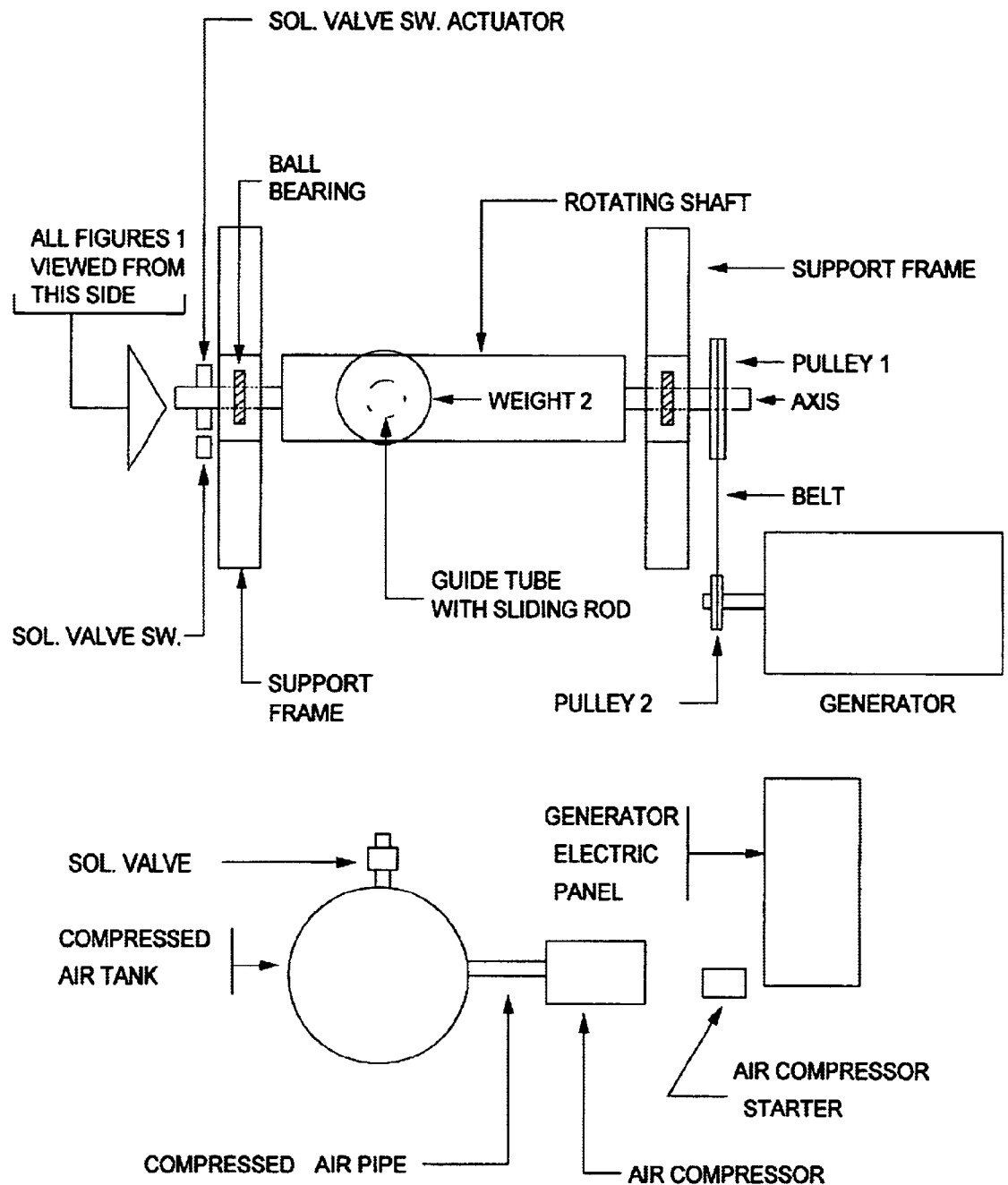
Figure 1B:
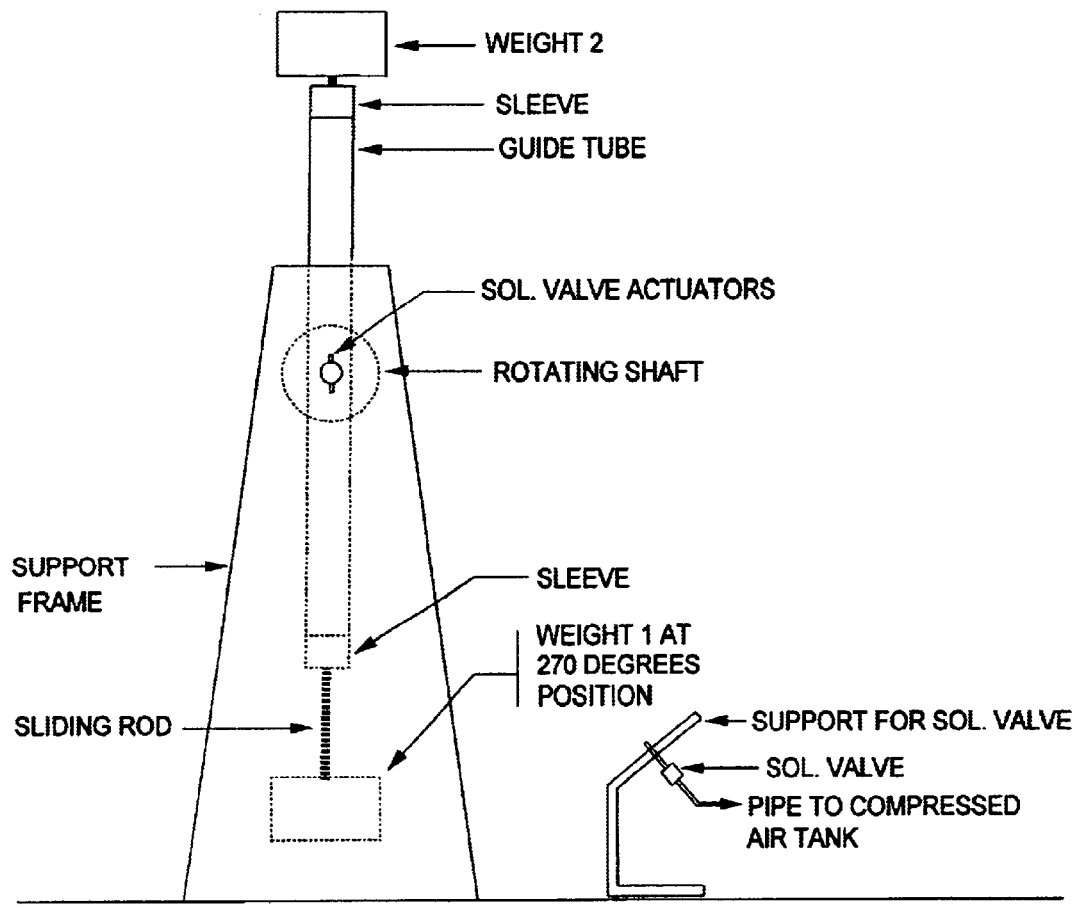
Figure 1C:
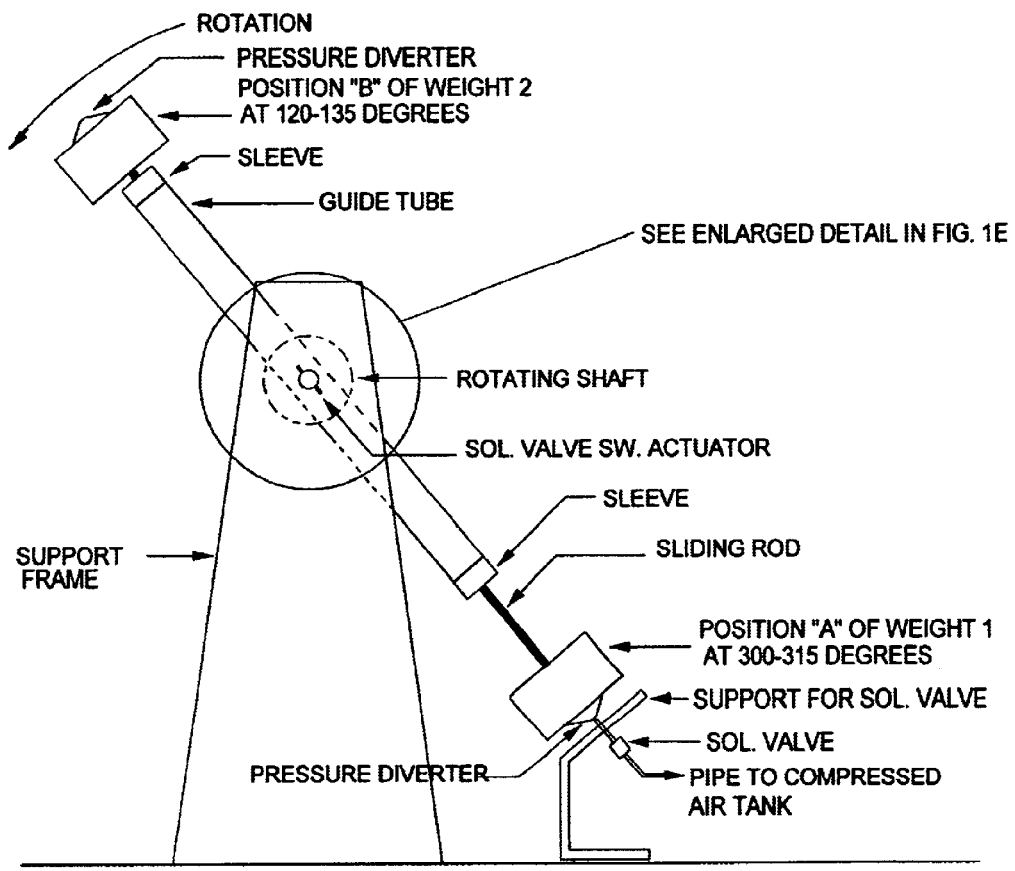
Figure 1D:
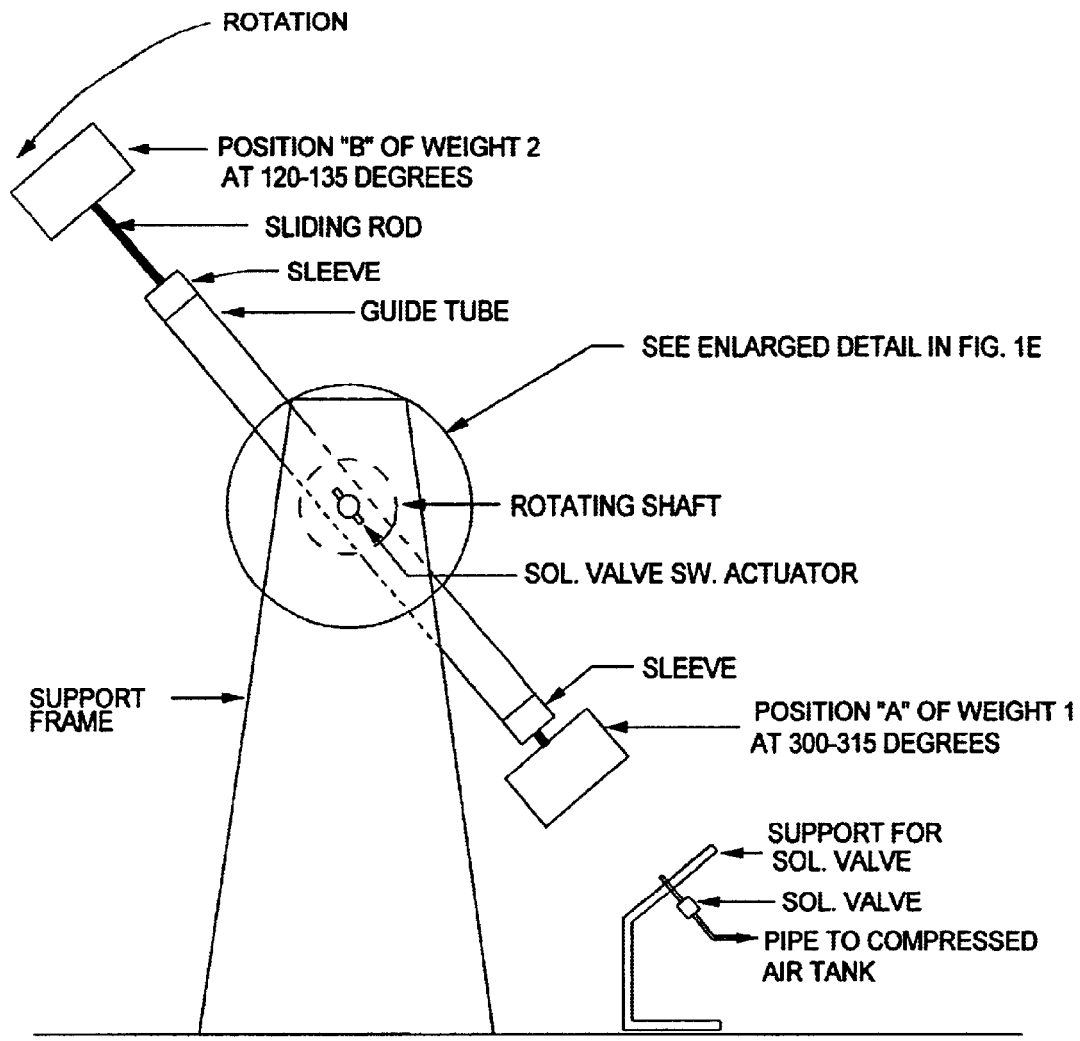
Figure 1E:
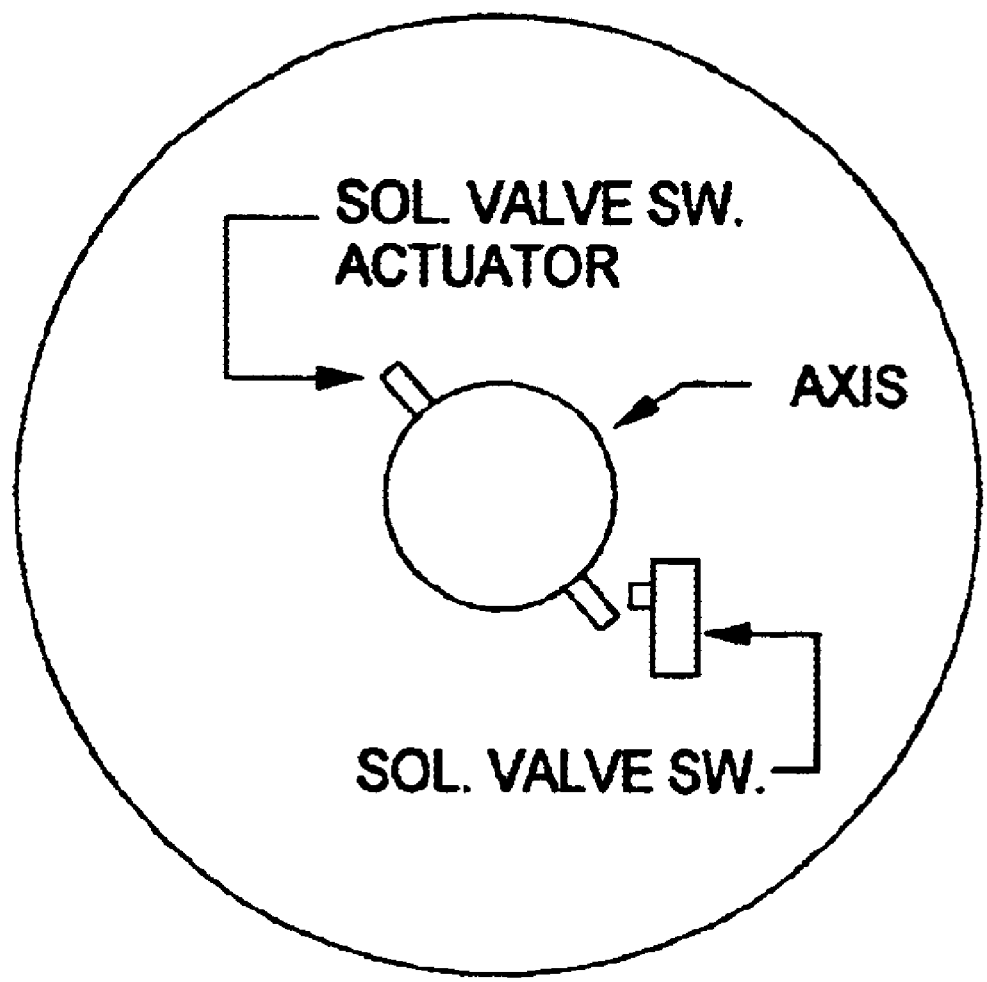
Figure 1F:
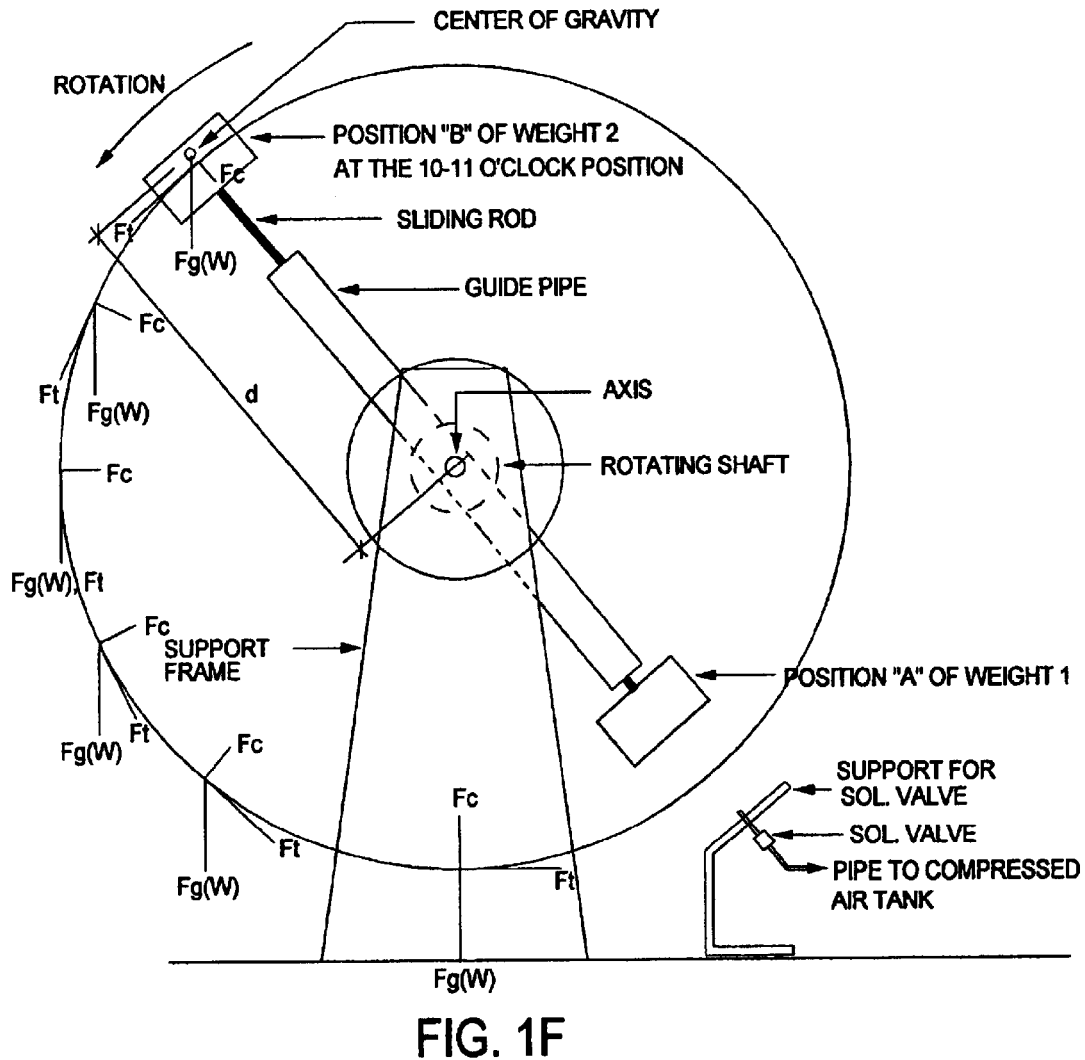
Figure 2:
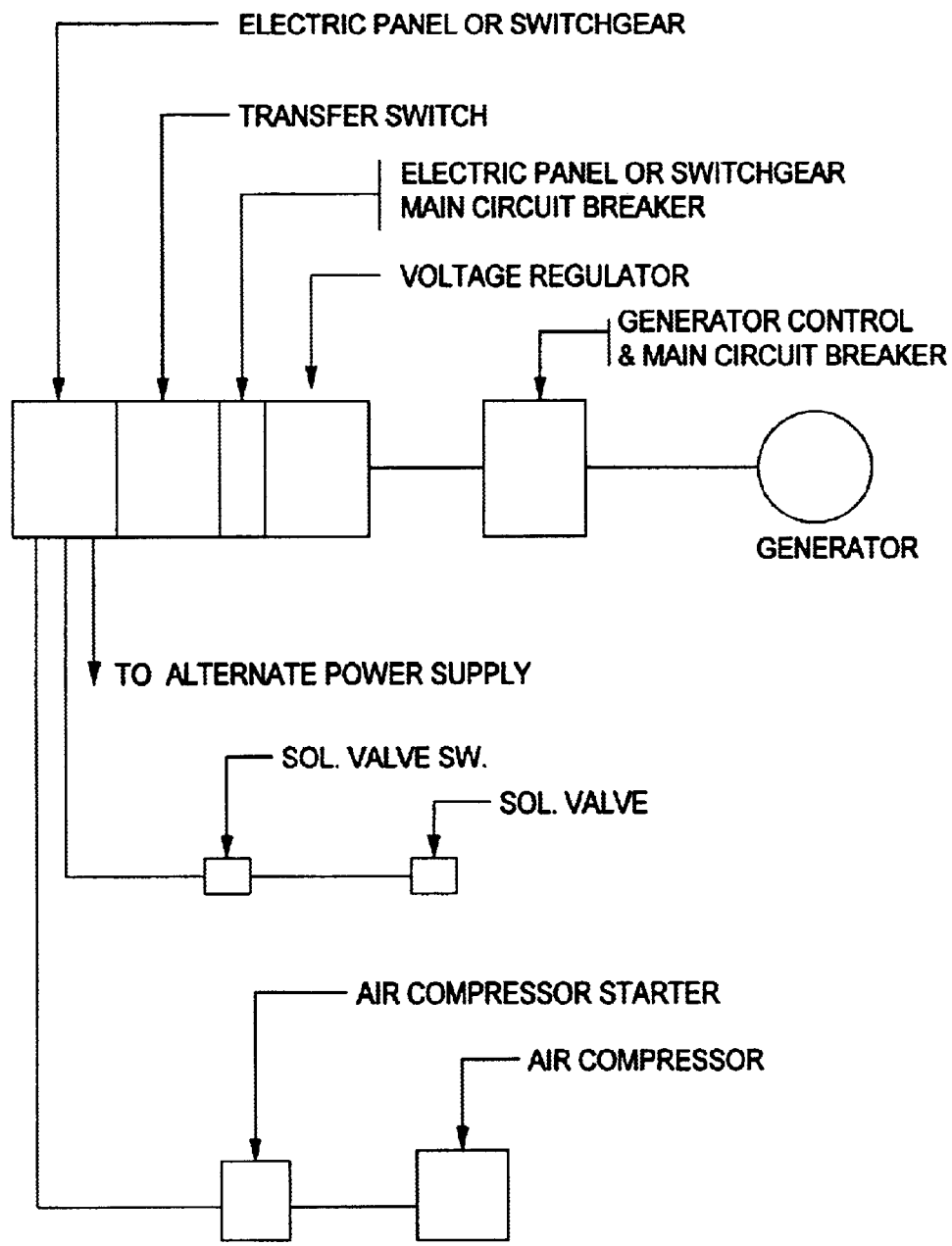

BRIEF DESCRIPTION OF THE SEVERAL FIGURES OF THE DRAWINGS a. FIG. 1A depicts de plan view of the KineMot System showing its main components in an orderly fashion.

b. FIG. 1B depicts the view from the left side of the FIG. 1A showing the rotating elements (weights, guide tube and sliding rod) in the standstill vertical position, that is, its normal position, or rest position and the position of the solenoid valve. Dotted lines indicate the elements behind the support frame.

c. FIG. 1C depicts the first movement position of the rotating elements at the moment where they are moved from its standstill position by the starter motor (in this case by the generator acting as the starting motor) to the position "A" where the solenoid valve discharges the blast of compressed air to move weight no. 1.

d. FIG. 1D depicts the displacement of weight no. 2 shortly after the discharge of compressed air by the solenoid valve on weight no. 1 in order to support rotation. As in previous figure, the position of the solenoid valve is shown.

e. FIG. 1E depicts the detail of the position of the solenoid valve actuator and the solenoid valve switch with respect to the KineMot axis at the 120–135 and 300–315 degrees where the blast of the compressed air is impressed on the weight at the 300–315 degrees.

f. FIG. 1F depicts the forces on weight no. 2 at position "B" of 120–135 degrees that causes the rotational movement due to the kinetic energy.

g. FIG. 2 depicts the elementary electrical interconnections between the components shown in FIG. 1A.

DETAILED DESCRIPTION OF THE INVENTION

The Kinetics Energy Motor derives its output energy from a rotational movement induced on a rotating shaft by the downward movement of a weight attached at the end of a sliding rod perpendicular to the rotating shaft which in its downward movement produces kinetic energy, and thereby provides its energy to move a load as an electrical generator and other mechanical devices to make work.

This motor consists of:

a. A rotating shaft of any hard material with an extended axis at both ends rotating on ball bearings, roller bearings or other means on the support frames at both ends of the shaft. See FIGS. 1A, 1B, 1C, 1D.

b. A guide tube made of the lightest and strong metal available of appropriate diameter perpendicular to the shaft with equal lengths at both sides with a sliding rod with equal weights moving through sleeves at both ends of the guide tube. This tube can be welded to the shaft or by other means that prevents its displacement from the shaft when hit by the movement of either weight in position "A". See FIG. 1C.

c. The sliding rod is a metal rod of suitable diameter and length with very low friction surface holding its 2 weights moving through sleeves in the guide tube. See FIGS. 1A, 1B, 1C, 1D.

d. The weights no. 1 and no. 2 are equal masses of any heavy material attached to the sliding rod at both ends (See FIGS. 1A, 1B, 1C, 1D). The material could be concrete housed in a metal cylinder of suitable diameter and length to provide enough weight to produce a downward movement when in position 120–135 degrees. See FIG. 1D.

e. The pressure diverter is a conical device attached to the weights as shown on FIG. 1C only. It consists of several conical sheet metal parts inside the exterior conical device to divert or distribute the air pressure from the nozzle on the area of the weight when at position "A" of 300–315 degrees.

f. The components named above on subparagraphs b, c and d can be installed in several times on the shaft to produce higher downward force for higher energy output at the axis.

g. The solenoid valve switch actuator is a tab or similar part attached to the axis that hits the solenoid valve switch roller arm when the rotating shaft and weight no. 1 moves to the 300–315 degrees position (See FIGS. 1C, 1E). Both tabs are 180 degrees apart. Some other means can be used instead of the solenoid valve switch actuator like a light beam through a hole in the axis to activate a solar cell, a magnetic switch or similar devices.

h. The solenoid valve switch is a limit roller or plunger switch mounted on the support frame where its arm is accessible to be hit by the solenoid valve actuator. See FIGS. 1A, 1B, 1C, 1D, 1E.

i. The support frames at both ends of the shaft consists of heavy metal as steel with sufficient height to clear the rotational motion of the weights. They shall be of such a heavy structure to support the weight of the moving elements as well as the impact force exercised on the shaft by the displacement of the weight in position "A" and "B" in order to produce the rotational movement. These frames shall be heavily supported to its base in order to prevent its turnover due to the upward force to displace the weights and its shaft. See FIGS. 1A, 1B, 1C, 1D.

j. At the right axis and attached to it is pulley no. 1 connected through a belt to pulley no. 2 of the driven load: the electrical generator. The pulley no. 1 is of a larger diameter than pulley no. 2 in order to provide greater rotational speed to the generator, being the rotational speed of the KineMot of very slow motion. The generator is one of general industry production. This generator is fixed and mounted to the KineMot platform or base. See FIG. 1A.

Auxiliary Components a. The compressed air tank is a steel tank of suitable volume and strength to store compressed air to cause the displacement of the weight in position "B" upon the discharge of its pressure when at position 300–315 degrees in order to provide its downward movement. See FIGS. 1A, 1C.

b. The solenoid valve is the electrical valve that opens upon being activated by the solenoid valve actuator in order to provide a force of compressed air to displace the weight in position "B" to the rotational position. See FIGS. 1A, 1B, 1C, 1D.

c. The air compressor provides compressed air to the tank. This compressor runs from alternate electric power to provide compressed air to start the movement of the KineMot, which once started its rotational movement will switch to the power generated by the electrical generator. See FIG. 1A and FIG. 2.

d. The generator is of current standard manufacture attached to the KineMot through belts in order to provide nominal generator RPM through the appropriate selection of pulley no. 1 to pulley no. 2 diameter ratio. A mechanical transmission can be used instead. See FIG. 1A.

Operation of the Kinetic Energy Powered Motor System

At standstill position the KineMot weights guide tube and sliding rod are aligned in balanced vertical position as shown in FIG. 1B. The following events shall occur in order to start rotation:

a. The compressed air tank shall be filled to the determined operating pressure by the air compressor. This compressor shall run from an alternate power supply.

b. Once the tank has the operating pressure the generator is run as a motor to start the rotation of the shaft and its guide tube with the weights and the sliding rod. The power supplied to run the generator as a motor comes from the alternate power supply.

c. Once the motor (the generator acting as a motor) moves the shaft into rotation, the weights 1 and 2 come into position shown in FIG. 1C, the tab hits the arm of the solenoid valve switch closing its electrical contacts and operating the solenoid valve to discharge the compressed air pressure with sufficient force to displace weight 2 to position "B" as shown in FIG. 1D. The unbalanced weight on the shaft forces a downward rotation provided by the kinetics energy of the weight at position 120–135 degrees. This energy is transmitted to the shaft and axis and thereon to the load attached to it. As the weight at position "B" continues its downward movement due to the kinetic energy and comes past the 270 degrees position to the 300–315 degrees position its inertia power drives it to position "A" (see FIG. 1C) where the rotation motion started and where the process continues on and on. Once the rotation is established, the alternate power for the generator acting as a motor and for the compressor is discontinued (see FIG. 2) and the generator starts generating its own power to feed the compressor and the solenoid valve. The difference in energy produced by the generator and the energy used by the compressor and the solenoid valve is the available energy to be used by any load connected to the generator.

Elementary Technical Information

For any given mass of "weight 2" its kinetic energy depends on the following forces at any position from 120–135 degrees to 270 degrees in its rotational downward movement—see FIG. 1F:

a. Gravitational Force ($Fg=Mass \times G$) is the weight of "weight 2".

b. Centripetal Force (weight $2 \times d$) is dependent on the displacement of the center of gravity of the combined weights of "weight 2", sliding rod and guide tube in their downward movement from the center of the axis, that is, higher force with increasing distance "d".

c. Tangential Force ($Ft=Weight \times V$) is dependent on the velocity "V" of "weight 2" along its downward rotational movement at any distance "d".

What is claimed is:

1. A method of turning a load such as a generator using compressed air comprising:

providing a rotatable shaft operationally coupled with the load and configured to deliver rotational energy to the load;

providing a guide pipe fixedly connected the rotatable shaft, wherein the guide tube is perpendicular to the rotatable shaft;

providing a sliding rod mounted in the guide pipe, wherein the sliding rod is longer than the guide pipe;

providing a first and a second weight attached at opposite ends of the sliding rod each having a pressure diverter configured to receive a discharge of compressed air;

providing a valve operationally coupled with a source of compressed air;

initiating rotational motion in the rotatable shaft, the guide, the sliding rod and the first and second weight; and discharging the source of compressed air through the valve, alternately, against the first and second weight to lift the sliding rod from a position of lesser potential energy to a position of greater potential energy wherein the sliding rod so lifted operates to turn the rotatable shaft.

* * * * *